(12) United States Patent
Greene et al.

(10) Patent No.: US 8,656,404 B2
(45) Date of Patent: Feb. 18, 2014

(54) STATISTICAL PACKING OF RESOURCE REQUIREMENTS IN DATA CENTERS

(75) Inventors: Daniel H. Greene, Sunnyvale, CA (US);
Maurice Chu, Burlingame, CA (US);
Haitham Hindi, Menlo Park, CA (US);
Bryan T. Preas, Palo Alto, CA (US);
Nitin Parekh, Los Altos, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 1234 days.

(21) Appl. No.: 12/253,111

(22) Filed: Oct. 16, 2008

(65) Prior Publication Data
US 2010/0100877 A1  Apr. 22, 2010

(51) Int. Cl.
*G06F 9/50* (2006.01)

(52) U.S. Cl.
USPC .......................................... 718/104; 718/102

(58) Field of Classification Search
USPC .................................................. 718/102, 104
See application file for complete search history.

(56) References Cited

U.S. PATENT DOCUMENTS

| | | | |
|---|---|---|---|
| 5,202,975 A * | 4/1993 | Rasbold et al. | 717/151 |
| 5,307,478 A * | 4/1994 | Rasbold et al. | 703/22 |
| 5,394,547 A * | 2/1995 | Correnti et al. | 717/175 |
| 5,471,408 A * | 11/1995 | Takamoto et al. | 703/2 |
| 6,987,729 B1 * | 1/2006 | Gopalakrishnan et al. | 370/230 |
| 7,003,475 B1 * | 2/2006 | Friedland et al. | 705/7.13 |
| 7,028,291 B2 * | 4/2006 | Sumida et al. | 717/128 |
| 7,386,465 B1 * | 6/2008 | Friedland et al. | 705/7.21 |
| 7,743,378 B1 * | 6/2010 | Markov | 718/102 |
| 7,752,622 B1 * | 7/2010 | Markov | 718/103 |
| 7,844,968 B1 * | 11/2010 | Markov | 718/102 |
| 7,984,447 B1 * | 7/2011 | Markov | 718/103 |
| 8,264,971 B2 * | 9/2012 | Alfano et al. | 370/242 |
| 2005/0192937 A1 * | 9/2005 | Barsness et al. | 707/3 |
| 2005/0198636 A1 * | 9/2005 | Barsness et al. | 718/100 |
| 2007/0011683 A1 * | 1/2007 | Helander | 718/104 |
| 2007/0106994 A1 * | 5/2007 | Jackson | 718/104 |
| 2009/0037242 A1 * | 2/2009 | Ventura et al. | 705/7 |
| 2009/0138682 A1 * | 5/2009 | Capps et al. | 712/220 |
| 2009/0138683 A1 * | 5/2009 | Capps et al. | 712/220 |

* cited by examiner

*Primary Examiner* — Aimee Li
(74) *Attorney, Agent, or Firm* — Marger Johnson & McCollom PC

(57) ABSTRACT

A computer-implemented method of managing resources in a virtual machine environment can include determining a specification of provisioning success corresponding to each of multiple jobs in the virtual machine environment, determining a prediction of resource needs corresponding to each of the jobs, and determining a resource specification corresponding to each of the jobs based on the specification of provisioning success and the prediction of resource needs.

18 Claims, 4 Drawing Sheets

STATISTICAL PACKING OF RESOURCE REQUIREMENTS IN DATA CENTERS

TECHNICAL FIELD

The disclosed technology relates to the field of virtual machines (VMs) in data centers and, more particularly, to various techniques pertaining to the statistical packing of virtual machine resource requirements in data centers.

BACKGROUND

Data centers are frequently used by various types of entities for a wide variety of purposes. Service providers such as phone companies, cable networks, power companies, retailers, etc., commonly store and access their customers' data in 'server farms,' or data centers. For purposes of the present specification, 'data center' refers to a facility used to house computer systems and associated components, such as telecommunications and storage systems. A data center generally includes not only the computer systems, but also back-up power supplies, redundant data communications connections, environmental controls such as air conditioning and fire suppression, security systems and devices, etc.

Data center operations generally revolve around customer service levels. For example, a particular customer may desire to have a defined quality of service for that customer's computations or data communications. The quality of service may have different requirements for different customers. For example, for one customer, the key measure of the quality of service may involve how fast an application responds when accessed remotely. For another customer, the quality of service may involve the speed or bandwidth of connections provided to that customer's subscriber.

A data center may commit to provide a particular service level for a given customer in the form of a formally negotiated service level agreement (SLA). An SLA typically specifies levels of availability, serviceability, performance, operation, billing, etc., and may even specify penalties in the event of violations of the SLA. SLAs commonly address performance measurement, problem management, customer duties, warranties, disaster recovery, and termination of agreement. For example, an SLA may demand that a particular job get a certain amount of resources with a specified probability. The SLA may also specify a limit on the amount of resources to be assigned to a certain job or group of jobs.

'Virtualization' generally refers to a technique for hiding physical characteristics of computing resources from the way in which other systems, applications, or end users interact with those resources. This typically includes making a single physical resource (e.g., a server, operating system, application, storage device, etc.) appear to function as multiple logical resources. Virtualization may also include making multiple physical resources appear as a single logical resource. In addition, it may include making one physical resource appear, with somewhat different characteristics, as one logical resource.

VMWare, Inc., is an example of a publicly-listed company that offers virtualization software products, such as VMWare's ESX Server.

Virtualization can essentially let one computer do the job of multiple computers, by sharing the resources of a single computer across multiple environments. Virtual machines (e.g., virtual servers and virtual desktops) can provides users with the ability to host multiple operating systems and multiple applications both locally and in remote locations, freeing users from physical and geographical limitations. In addition to energy savings and lower capital expenses due to more efficient use of hardware resources, users can get a high availability of resources, better desktop management, increased security, and improved disaster recovery processes.

Virtual machines serve a wide variety of purposes in a given computer system. For example, virtual machines may be used to provide multiple users with simultaneous access to the computer system. Each user may execute applications in a different virtual machine, and the virtual machines may be scheduled for execution on the computer system hardware. Virtual machines may be used to consolidate tasks that were previously running on separate computer systems, for example, by assigning each task to a virtual machine and running the virtual machines on fewer computer systems. Virtual machines may also be used to provide increased availability. If the computer system fails, for example, tasks that were executing in virtual machines on the computer system may be transferred to similar virtual machines on another computer system.

Using virtual servers enables the migration of processing tasks to other physical servers or resources transparently to the consumers of the services provided by the virtual server, where the consumer may be a user, a process, another computer, etc. A 'consumer' is typically any entity that uses a process or service within the power control system. This is contrasted with a 'customer' which is an identified entity to which the data center provides services according to a service level agreement. Performance levels are generally tracked by customers.

A virtual server differs greatly from a physical server. A virtual server typically appears to be a single server to entities accessing it, while it may actually be a partition or subset of a physical server. It may also appear as a single server but actually be comprised of several physical servers. A virtual server is created through a virtualization process, as discussed above.

Thus, in a given data center, virtualization allows multiple virtual machines (e.g., virtual servers) to share the physical resources (e.g., CPU, memory, disk, and networking resources) of the same physical machine(s) in the data center. Each virtual machine typically has a corresponding specification of resource requirements that determines how much of the physical resources should be reserved for the given virtual machine.

However, a typical specification of resource requirements for a virtual machine undesirably overbooks or reserves more physical resources than are actually needed most of the time by the virtual machine, which results in the unnecessary wasting of physical resources. Thus, there exists a need for greater reductions in cost and power consumption by virtual machines in data centers.

DETAILED DESCRIPTION OF THE EMBODIMENTS

Figure 1:
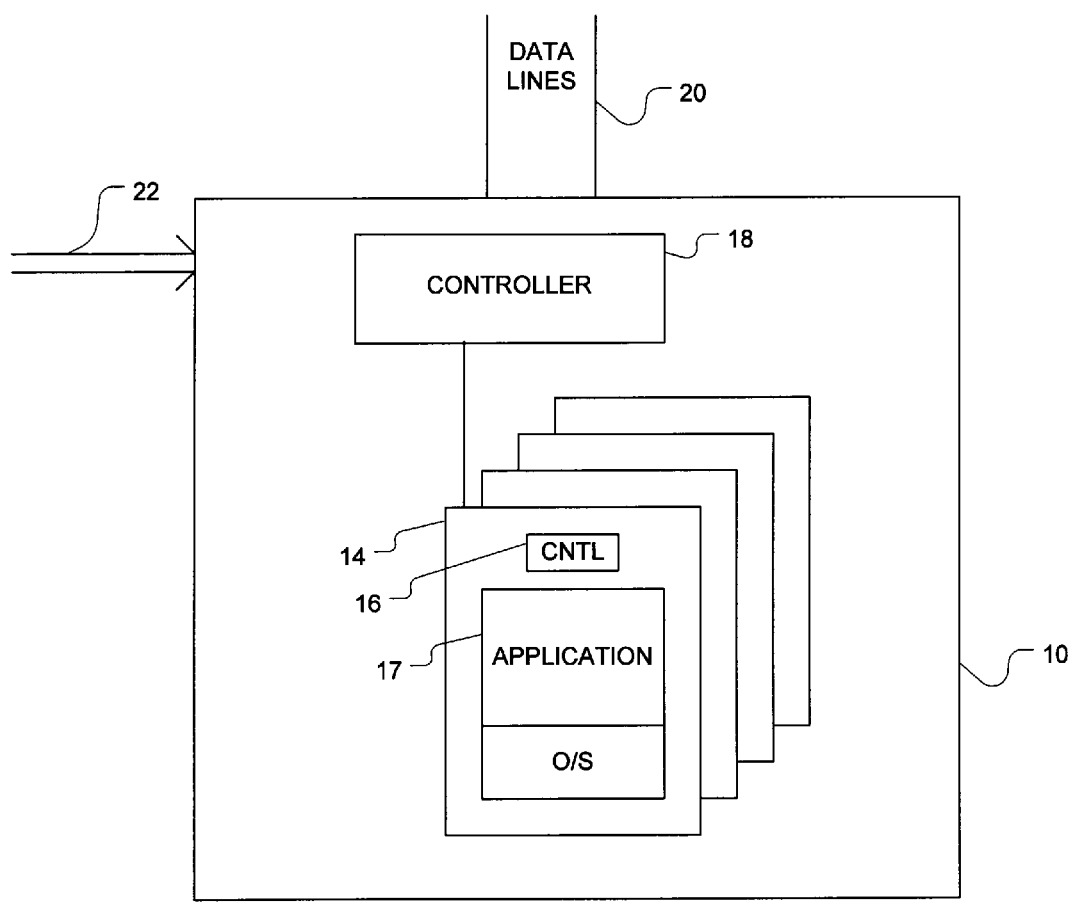
FIG. 1 shows an exemplary embodiment of a data center.

FIG. 1 shows an exemplary architecture 10 for a data center. In this embodiment, the data center includes multiple physical devices 14 (e.g., servers). A physical device 14 is an actual machine, such as a quad-, dual- or single-core computing system that provides a particular service. Examples include communications servers, database servers, applications servers, etc.

As such, each physical device 14 is depicted as being having at least one virtual machine 17 (e.g., virtual server) operating on it. A virtual machine 17 may include an application running on top of an operating system, for example. This discussion is provided merely for demonstrative purposes and no limitation of location or logical hierarchy is intended, nor should one be implied.

In the example, the virtual machine 17 allows a low-level module 18 (e.g., a service/power controller) to task the physical devices 14 with processing tasks in virtual machines based in part on the resource needs of the virtual machines and the resource of the physical devices 14. The low-level module 18 may be referred to as a controller or scheduler. The controller 18 can schedule the processing of virtual machines, or the controller 18 can schedule individual tasks to be performed within virtual machines. As used herein, the term "job" generally refers to the virtual machine or task being scheduled.

In the example, the controller 18 is shown as being a single controller, while it may actually be distributed across several computers, processing cores, etc. The controller 18 can migrate jobs between physical machines and adjust the power consumption of physical machines. In addition to the central controller 18, one or more of the individual physical devices 14 may have local controllers such as 16. Further, while the only devices depicted in the example are servers, other types of devices may be included, such as power supplies, storage arrays or other types of storage, tape decks, etc.

The centralized controller 18 may be coupled to data lines 20. The functions of the data center generally revolves around data processing of some sort, and the controller may merely exist in the same power distribution structure as the data lines, or the power controller may monitor or affect the operation of the data lines.

Similarly, the power controller may merely exist in the same power structure as the power lines 22, or the controller 18 may take a more active role with the power lines 22. The power lines 22 come in from 'the grid,' or the local power infrastructure that generally includes transmission lines, converters, transformers, power switches, etc.

In certain embodiments, the resources requirements for each virtual machine in a given virtual machine environment can be predicted statistically and potentially described by a histogram. Predictions of resource requirements can be performed by various techniques, such as "time-of-day conditioning" (i.e., conditioning based on the time of day certain resources are used) and Markov modeling (i.e., reaching future states through a probabilistic rather than deterministic process). However, one of skill in the art will recognize that any of a number of known modeling techniques can be used to generate such histograms.

"Time-of-day conditioning" and Markov modeling are typically based on observations of historic resource usage data. Each technique is capable of capturing resource needs that may be extreme at certain times of day and extreme for brief periods of time, and that may occur at unpredictable times. Such behavior typically results in the wasting of resources, because resource requirements are usually set unnecessarily high all of the time.

Predicted resource needs may take into account various types of information, such as resource usage based on time of day, day of week, what amount of resources a given job needed in a preceding time interval (e.g., within the last ten minutes), and any other information that can be used to improve the predictability of resource usage by the job.

In certain embodiments, the predicted resource needs are provided in the form of histograms, which allow for considerable flexibility in the kind of modeling used to predict resource requirements. Prediction and packing can be performed at different frequencies. As used herein, "packing" (or "packing together") generally refers to a technique intended to reduce a total amount of resources required by a group of jobs in a virtual machine environment by considering the resource needs of the group of jobs as a whole as well as the resource needs of each of the jobs individually.

Since virtual machine resource needs are typically well predicted over short periods of time, re-computing of the packing and adjusting resource requirements every 5-10 minutes can be very beneficial. The techniques described herein, however, can desirably be used to pack at a variety of frequencies.

Convolving histograms provides a distribution of the sum of the resource requirements of several virtual machines, assuming that their resource needs are statistically independent. When virtual machines are dependent, there are several options. For example, the virtual machines can be scheduled together in a pool, with their total resource needs represented as a single histogram that captures their correlated behavior. This pool can then participate in the packing techniques described herein. Dependent virtual machines can also be segregated into several different pools, where the members of the pool are not highly correlated. In these instances, the packing techniques described herein are applied separately to each pool.

The packing techniques can include using a specification of required provisioning success as input. In an exemplary embodiment of the disclosed technology, it is assumed that a provided service level agreement (SLA) for a customer requires a certain probability p that resource needs are met for a given virtual machine. The probability p can be specified directly in the SLA or derived from other information in the SLA. For example, an SLA may specify that resource needs for a virtual machine are to be met all the time (with a penalty for failing to do so), in which situation the probability p would typically be assigned a small value so that failure (and penalties) would be infrequent, at most. For SLAs that specify a less well-defined resource requirement, a value for p can be determined that might be higher but would still meet a customer's expectations. Additionally, SLAs may include caps on certain criteria such as maximum resource needs.

Embodiments of the disclosed technology can take as input various types of parameters. In exemplary embodiments, input parameters include a prediction of resource needs for at least one virtual machine (e.g., presented as a histogram), and a required provisioning success (e.g., a probability p corresponding to a maximum rate of failure required to provide full resource needs).

Figure 2:
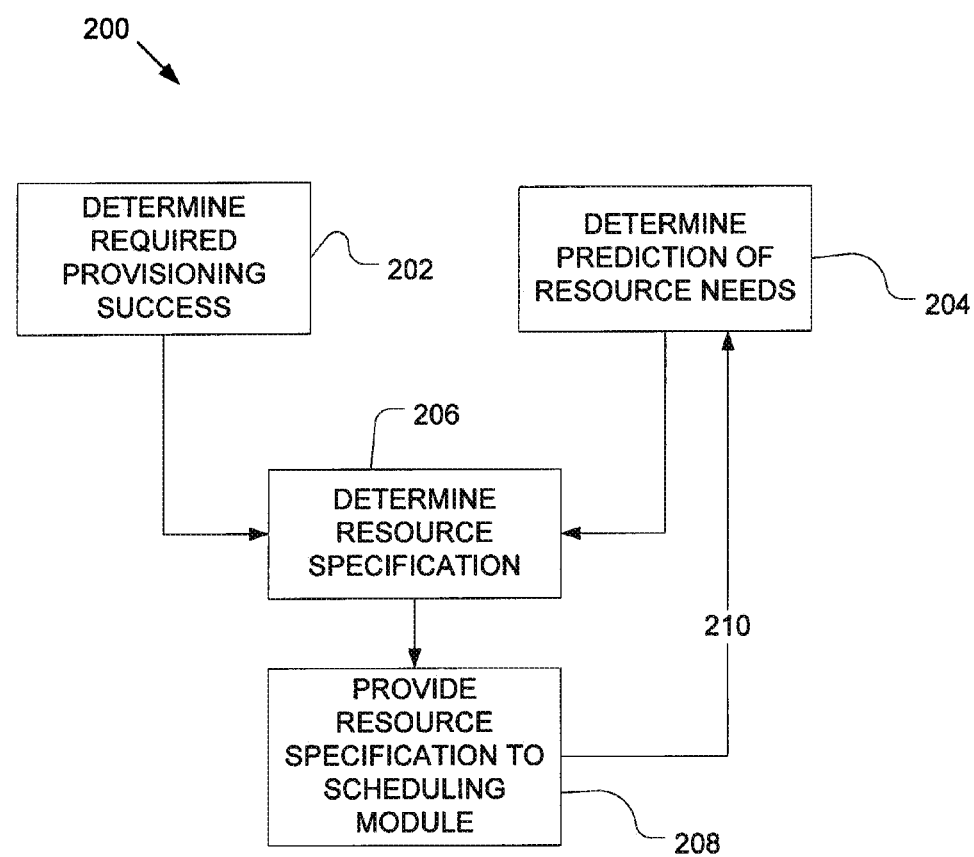
FIG. 2 is a flowchart of a first exemplary computer-implemented method of managing resources in a virtual machine environment.

FIG. 2 is a flowchart of an exemplary computer-implemented method 200 of managing resources in a virtual machine environment.

At 202, a required provisioning success is determined for each of multiple jobs to be scheduled in a given virtual machine environment. For example, the required provisioning success can be derived from a corresponding service level agreement (SLA), which can explicitly or implicitly provide information pertaining to the probability requirement.

At 204, a prediction of resource needs is determined for each of the jobs. The prediction can indicate an amount of resources needed by a particular job for it to properly execute, for example. Determining the prediction 204 can include using one or more techniques such as time of day conditioning and Markov modeling.

Steps 202 and 204 can be performed at different times or they can be performed at least partially or fully concurrently with each other.

At 206, a resource specification for each job can be determined based on the required provisioning success determined at 202 and the prediction determined at 204. The resource specification can be in a form suitable for virtual machine scheduling systems. The resource specification can, for example, include minimum and maximum resource requirements for the virtual machines. The resource specification can thus result in a reduction of the total resources reserved by the virtual machines in a cluster.

At 208, the resource specification determined for each job can be provided to a lower-level scheduling module. For example, the lower-level scheduling module can perform various types of scheduling-related operations with respect to the given jobs, such as scheduling jobs that have not been scheduled yet, consolidating jobs on fewer physical servers, and adjusting the schedule for jobs on the same physical server.

In certain embodiments, the step of determining a prediction of resource needs 204 can be repeated (e.g., at 210). Responsive to the repeated determination of the prediction of resource needs, as well as the previously determined required provisioning success, the previously determined resource specification can be adjusted. For example, the techniques used at 206 can be re-applied here.

In certain embodiments, an optimization algorithm (e.g., a greedy packing algorithm) can be used to find a packing that, while desirable, may not represent the best-case scenario (e.g., maximum packing). Such embodiments are generally preferable in situations where approximation speed is prioritized higher than maximum packing ability. In other words, these embodiments provide fast approximation that still achieves some or most of the benefit of statistical packing while potentially erring in reserving more resources than are actually required. Such erring, however, is typically only very slight in inconsequential, particularly in light of the advantageous packing.

In certain embodiments, an action list can be formed. In the action list, jobs having the most severe requirements can be placed at the beginning. The action list can then be processed in order, and a resource specification can be chosen for each virtual machine. For example, a virtual machine can be given a resource specification consisting of a minimum resource reservation that will insure that the virtual machine will have all the resources it needs with a failure probability less than p.

While processing the action list, the algorithm may discover that it has already made enough individual minimum resource reservations such that it can ensure that the total allocation for a resource pool (e.g., an amount of resources intended for use by a group of jobs rather than a single job) is large enough that the combined requirements of the virtual machines sharing the pool have a failure probability that is not greater than the failure probability p for the individual virtual machine being processed, in which case no individual reservation may need to be made for the virtual machine being processed or for subsequent virtual machines on the action list.

In this way, the algorithm can allocate a large amount of resources to premium jobs until the total allocation reaches a level that is sufficient to satisfy a low failure probability for the pool, for example. Additional jobs can be deemed to require no separate allocation because they effectively share the reservation of the premium jobs.

Figure 3:
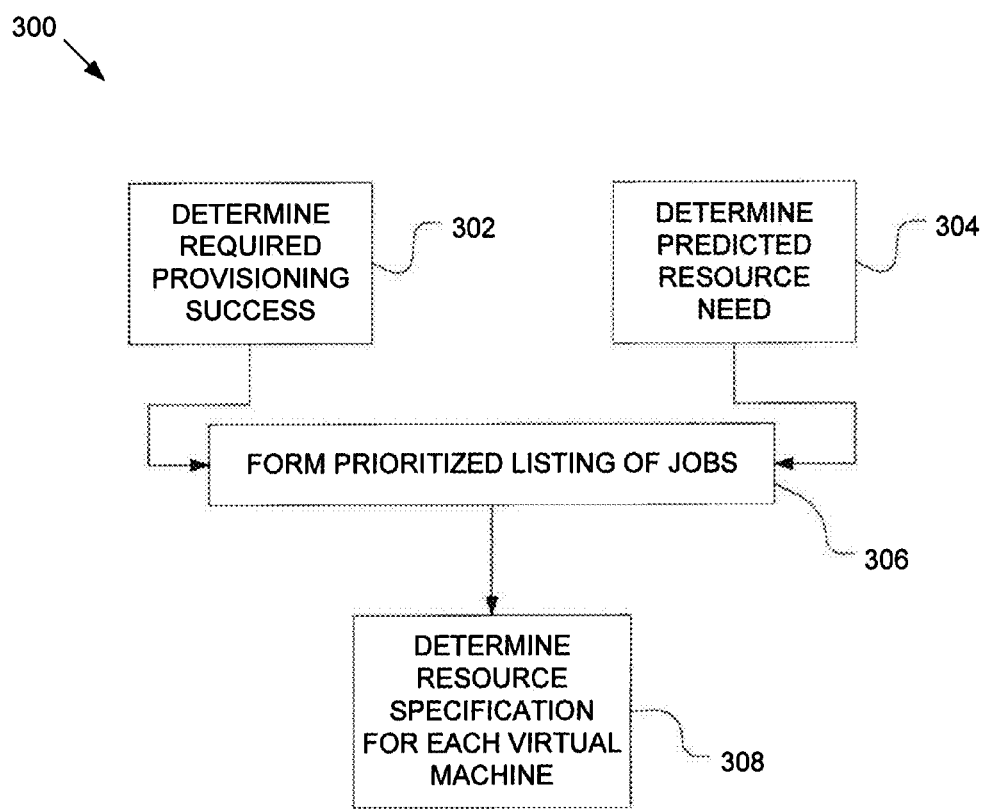
FIG. 3 is a flowchart of a second exemplary computer-implemented method of managing resources in a virtual machine environment.

FIG. 3 is a flowchart of an exemplary computer-implemented method 300 of managing resources for virtual machines in a virtual machine environment.

At 302, a required provisioning success corresponding to each of several jobs in the virtual machine environment can be determined. For example, the required provisioning success can be derived from a corresponding service level agreement (SLA).

At 304, a predicted resource need corresponding to each of the jobs can be determined. For example, the predicted resource need can be based on a-priori information given by the user in configuring the job, and can also be based on historical data from previous processing of the job.

At 306, a prioritized listing of the jobs can be formed. For example, the jobs can be ranked according to a level of importance assigned to each of them. The level of importance can be determined for each job based at least in part on the required provisioning success determined at 302 as well as other pertinent information provided by the customer (e.g., in an SLA) such as a severity level, for example.

Once the prioritized listing has been created, a resource specification can be assigned to each of the jobs based on the prioritized listing, the job's previously determined required provisioning success, and the job's predicted resource need. At 308, the jobs are processed in order (e.g., according to level of importance) to determine an individual resource specification based on each job's individual needs as well as any resources that have been specified for the group of higher priority jobs earlier in the list and will be available to the job if they are not fully utilized by the higher priority group.

The following exemplary procedure ("ReserveIndividual") describes how a reservation can be determined for a single virtual machine. In the example, the input includes the virtual machine's predicted resource need described by a histogram ("hist") (e.g., an array of frequencies of resource needs where hist[i] is the probability that the virtual machine will need a resource amount between i*histStep and (i+1)*histStep). The input also includes a required provisioning success that is specified with an allowed failure probability ("prob"):

```
procedure ReserveIndividual(hist[.], prob)
    acc <- 0;
    i <- length of hist[.];
    while acc < prob do
        acc <- acc + hist[i];
        i <- i-1;
    return (i + 1) * histStep
```

A smaller total reservation can be achieved if the reservations are computed for a group of virtual machines together, as described in the following exemplary procedure ("ReserveGroup"). In the example, the histograms for all the virtual machines are given in a two dimensional array ("histograms[.,.]").

```
procedure ReserveGroup(histgrams[.,.], probs[.])
    combined <- Convolve all histograms;
    for each individual virtual machine j do
        intercept <- ReserveIndividual(hist[j,.], prob[j]);
        otherIntercept <- ReserveIndividual(combined[.], prob[j]);
        actionList[j] <- {j, intercept, otherIntercept}
        solution[j] <- 0;
```

```
sort actionList in descending order of its third component
    "otherIntercept"
acc <- 0
while actionList has elements do
    front <- remove first element from actionList
    if front[3] > acc then
        allocation <- Min[front[2], front[3] – acc];
        solution[front[1]] <- allocation;
        acc <- acc + allocation;
    else
        return solution
```

The exemplary "ReserveGroup" procedure forms an action list where the jobs with the most severe requirements are placed at the beginning of the list. The action list is processed in order, and an allocation is chosen for each virtual machine according to one of the following two strategies: either the virtual machine is given its individual requirement necessary to meet its allowed failure probability (e.g., prob[j] from the previous procedure), or the total allocation for the pool is ensured to be large enough that the combined virtual machine requirements will not fail with a probability greater than the probability prob[j] for the individual virtual machine being processed.

In certain embodiments, an exact optimal solution can be determined. In these embodiments, a binary search can be performed to find an optimal "total" reservation for the pool. For example, the feasibility of each postulated value for the "total" can be tested by computing individual reservations. If the individual reservations sum to less than the postulated "total," then the "total" can be deemed to be feasible. The binary search can be used to find the smallest possible "total" that is feasible. Individual reservations for virtual machines can be computed by considering the joint distribution of each individual virtual machine's histogram and a combined histogram for all of the other virtual machines in the environment.

For an exemplary postulated value of a "total" allocation, individual reservations can be computed with a function (see, e.g., the "Required" function below) that, when considering a single virtual machine in a given environment, can consider the resource needs of all of the other virtual machines in the environment represented by a (cumulative) convolution (see, e.g., "accumulatedOther" below) and then find the smallest reservation i such that the probability that the virtual machine needs more than its resource reservation (and cannot obtain extra resources from the resource pool) is less than a specified failure probability. In certain embodiments, the reservation i represents the substantially smallest value such that the probability that the virtual machine requires j (which is more than i) and that the "accumulatedOther" requires more than the "total" minus j, is less than the specified failure probability.

```
procedure BuildAccumulatedOther(histograms[.,.], j)
    combinedOther <- convolve all histograms except for j
    acc <- 0;
    i <- length of combinedOther;
    while i > 0 do
        acc <- acc + combinedOther[i];
        accumulatedOther[i] <- acc;
        i <- i – 1;
    return accumulatedOther[.];
procedure Required(accumulatedOther[.], hist[.], total, prob)
    accFailure <- 0,
    i <- length of hist[.]
    while accFailure < prob do
        if i < total then
            otherFailure <- accmulatedOther[total – i];
        else
            otherFailure <- 1.0;
        accFailure <- hist[i] * otherFailure;
        i <- i – 1;
    return i+ 1;
```

Figure 4:
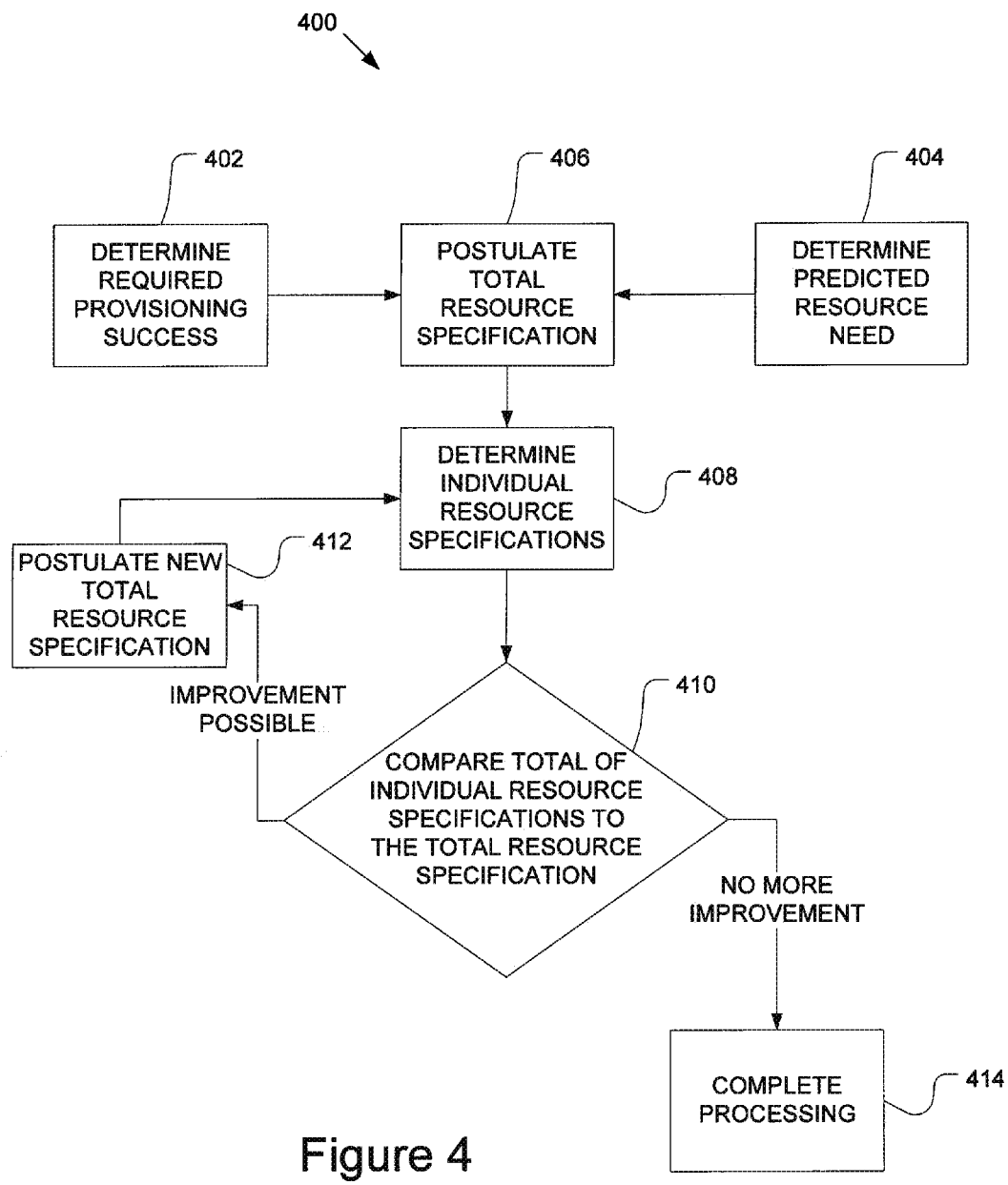
FIG. 4 is a flowchart of a third exemplary computer-implemented method of managing resources in a virtual machine environment.

FIG. 4 is a flowchart of an exemplary computer-implemented method 400 of managing resources for virtual machines in a virtual machine environment.

At 402, a required provisioning success corresponding to each of several jobs in the virtual machine environment can be determined. For example, the required provisioning success can be derived from a corresponding SLA.

At 404, a predicted resource need corresponding to each of the jobs can be determined. For example, the predicted resource need can be based on a-priori information given by the user in configuring the job, and can also be based on historical data from previous processing of the job.

At 406, a total resource specification can be postulated. Once the total resource specification has been postulated, individual resource specifications for the virtual machines can be determined based on the postulated total, as shown at 408.

At 410, a comparison can be made between the total of the individual resource specifications (determined at 408) and the total resource specification (postulated at 406). If an improvement can be made, then a new total resource specification can be postulated (as shown at 412) and processing can return to 408. Otherwise, if there does not seem to be any indication of further improvement resulting from continued processing, the process can finish, as shown at 414.

Below is an exemplary procedure ("ReserveGroupExact") that can be used in conjunction with certain embodiments of the disclosed technology:

```
procedure ReserveGroupExact(histograms[.,.], probs[.])
    combined <- convolve all histograms
    for each VM j do
        accumulateOther[j] <- BuildAccumulateOther[histograms[.,.], j];
    maxTotal <- ReserveIndividual[combined, min of probs];
    minTotal <- 0;
    solution <- TestSolution[maxTotal,...];
    while maxTotal > minTotal + 1 do
        middle <- Floor[ (maxTotal + minTotal)/2 ];
        temp <- TestSolution[middle,...];
        if temp is not feasible
            minTotal <- middle;
        else
            maxTotal <- middle;
            solution <- temp;
    };
    solutionTotal <- sum of solution;
    extra = maxTotal – solutionTotal;
    distribute extra evenly among solution;
procedure TestSolution(total,accumulateOther[.],histograms[.,.],
                probs[.]])
    for each VM i do
        required[i] <- Required[accumulateOther[i], histograms[i],
                    total, probs[i]];
    if sum of required does not exceed total
        return required (indicating it is feasible)
    else
        return infeasible
```

The techniques described herein can achieve a reduced total resource specification by considering the resource needs of a group of jobs when the resource needs of individual jobs are determined. The group of jobs often has more predictable needs, which typically means that there is less need for excess individual resource specification. In the example of FIG. 3, the group is a collection of higher priority jobs that were already specified. In the example of FIG. 4, the group is the entire collection of jobs, whose specification is postulated. One having ordinary skill in the art will understand that a number of possible choices exist to reduce uncertainty and reduce the resource specifications.

The techniques described herein typically assume that the given jobs are independent, although such techniques may be modified to handle a virtual environment having multiple jobs, some of which may be dependent upon other jobs in the environment.

Additionally, two or more of the techniques described above can be flexibly implemented in combination with one another. For example, in some embodiments, an approximation-type implementation can be utilized and, if certain parameters are met (e.g., if there is still enough processing time left), an exact-optimal-solution-type implementation can also be utilized (e.g., to refine the solution).

The techniques described herein can provide an output representing a minimum reservation that can be made for each applicable virtual machine. This minimum reservation can be a typical parameter in a virtual machine specification language (e.g., in VMWare and other virtualization products). These reservations can be computed such that the virtual machines can be combined in a single pool on a cluster of physical machines. A scheduler (typically part of virtualization products) can allocate resources and locate jobs on physical machines to meet the minimum reservations first, before allocating excess resource to other jobs. Exemplary embodiments of the disclosed technology can assume that minimum resources will be met first but make no assumption about how resources in excess of minimums are to be shared among virtual machines.

Application of the techniques described herein can desirably allow data center operators and users (e.g., customers) rely on more accurate and more compact physical resource reservations in a data center, which provides various advantages. For example, the freeing of physical resources for more customers will typically result in improved business performance for the data center, and the reduction of the number of running physical servers will reduce energy costs for data center operators and reduce costs for users.

The various advantageous techniques described herein may be implemented as computer-implemented methods. Additionally, they may be implemented as instructions stored on a tangible computer-readable medium that, when executed, cause a computer to perform the associated methods. Examples of tangible computer-readable media include, but are not limited, to disks (such as floppy disks, rigid magnetic disks, optical disks, etc.), drives (e.g., hard disk drives), semiconductor or solid state memory (e.g., RAM and ROM), and various other types of recordable media such as CD-ROM, DVD-ROM, and magnetic tape devices.

It will be appreciated that several of the above-disclosed and other features and functions, or alternatives thereof, may be desirably combined into many other different systems or applications. Also that various presently unforeseen or unanticipated alternatives, modifications, variations, or improvements therein may be subsequently made by those skilled in the art which are also intended to be encompassed by the following claims.

What is claimed is:

1. A computer-implemented method of managing resources in a virtual machine environment, comprising:

determining a specification of provisioning success corresponding to each of a plurality of jobs in the virtual machine environment;

determining a prediction of resource needs corresponding to each of the plurality of jobs;

responsive to the specification of provisioning success and the prediction of resource needs, determining a resource specification corresponding to each of the plurality of jobs, wherein determining the resource specifications comprises applying an optimization algorithm that prioritizes approximation speed higher than maximum packing ability;

forming an action list, wherein certain jobs having the most severe predictions of resource needs are placed at the beginning of the action list, and processing the action list in order, wherein said processing comprises choosing each resource specification for a particular virtual machine.

2. The computer-implemented method of claim 1, wherein determining the specification of provisioning success comprises deriving the specification of provisioning success from a corresponding service level agreement (SLA).

3. The computer-implemented method of claim 1, wherein determining the prediction of resource needs includes building a model based on historical data pertaining to past resource needs.

4. The computer-implemented method of claim 3, wherein predicting the resource needs comprises time of day conditioning.

5. The computer-implemented method of claim 3, wherein predicting the resource needs comprises Markov modeling.

6. The computer-implemented method of claim 1, wherein determining the resource specification corresponding to one of the plurality of jobs comprises determining additional resources that should be specified for the job that extend beyond resources specified for a group of jobs.

7. The computer-implemented method of claim 6, wherein the group of jobs comprises jobs specified previously in a priority order.

8. The computer-implemented method of claim 1, wherein the determined resource specification comprises a minimum amount of resources to be reserved for the corresponding one of the plurality of jobs.

9. The computer-implemented method of claim 1, further comprising:

repeating determining the prediction of resource needs; and responsive to the repeated determined prediction of resource needs and the determined specification of provisioning success, adjusting a determined resource specification corresponding to one of the plurality of jobs.

10. The computer-implemented method of claim 1, further comprising providing the determined resource specification to a lower-level scheduling module.

11. One or more tangible computer-readable media storing thereon machine-executable instructions that, when executed by a processor, perform the computer-implemented method of claim 1.

12. The computer-implemented method of claim 1, wherein said optimization algorithm is a greedy packing algorithm.

13. The computer-implemented method of claim 1, wherein said choosing comprises giving the virtual machine a resource specification consisting of a minimum resource reservation that will insure that the virtual machine will have all the resources it needs with a failure probability less than p.

14. The computer-implemented method of claim 13, further comprising determining whether a total allocation for a resource pool is large enough that combined requirements of multiple virtual machines sharing the resource pool have a failure probability that is not greater than the failure probability p for the individual virtual machine being processed.

15. The computer-implemented method of claim 14, wherein the optimization algorithm can allocate a large amount of resources to premium jobs until the total allocation reaches a level that is sufficient to satisfy a low failure probability for the resource pool.

16. The computer-implemented method of claim 15, further comprising determining that additional jobs require no separate resource allocation.

17. The computer-implemented method of claim 1, wherein processing the action list comprises giving each virtual machine its individual requirement necessary to meet its allowed failure probability.

18. The computer-implemented method of claim 1, wherein processing the action list comprises ensuring that a total allocation for a resource pool is large enough that the combined virtual machine requirements will not fail with a probability greater than a probability for the individual virtual machine being processed.

* * * * *